March 9, 1954

W. V. SHEPPARD 2,671,653

COAL CUTTING MACHINE WITH REVERSELY
POSITIONABLE TWIN SHEARING JIBS

Filed Jan. 16, 1952

William Vincent Sheppard
By Fraser, Myers & Manley
Atty's.

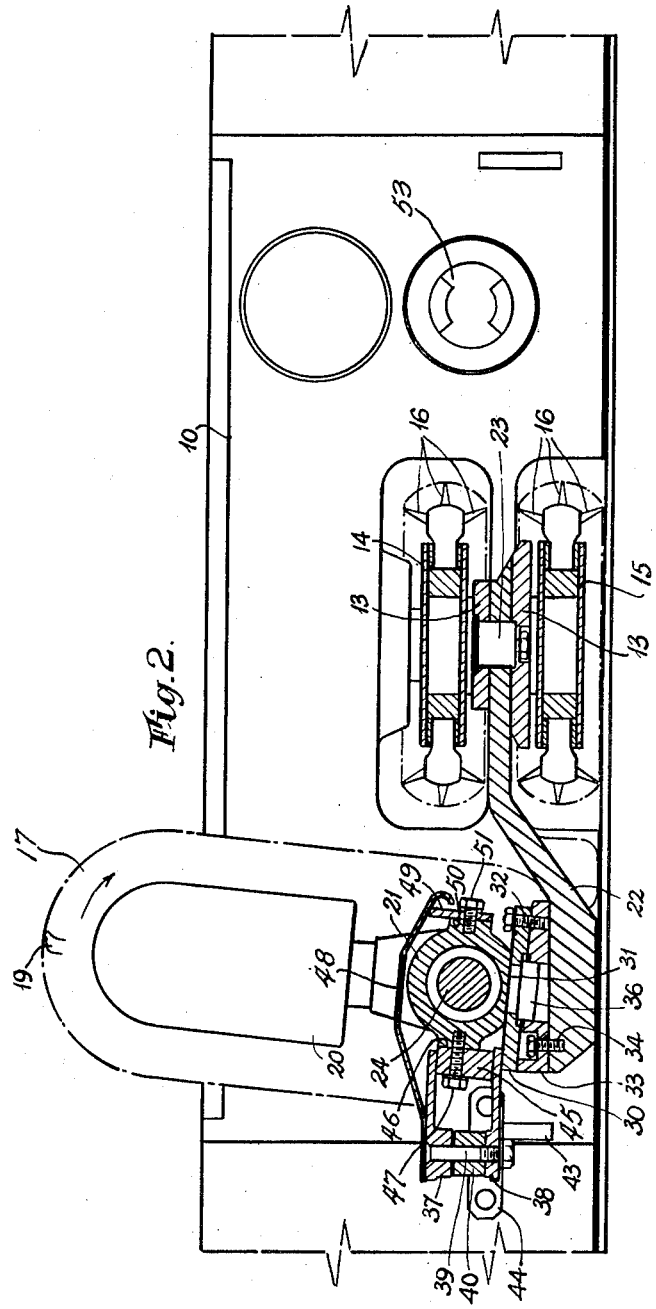

March 9, 1954
W. V. SHEPPARD
2,671,653
COAL CUTTING MACHINE WITH REVERSELY
POSITIONABLE TWIN SHEARING JIBS
Filed Jan. 16, 1952
3 Sheets-Sheet 3
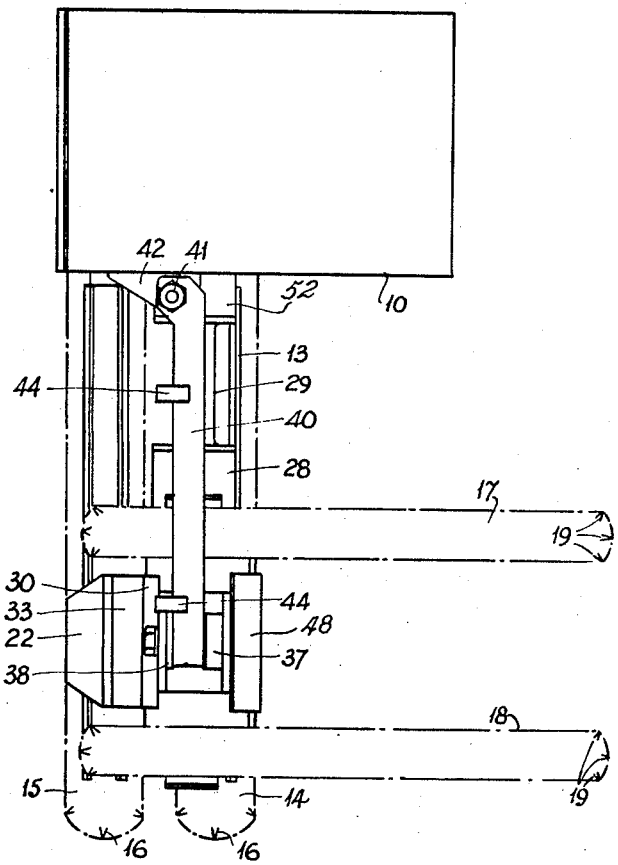
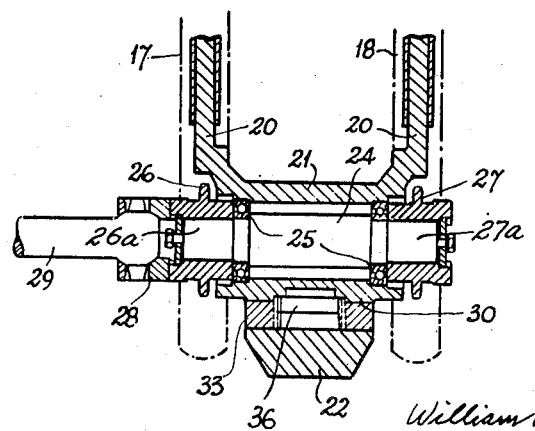

Patented Mar. 9, 1954

2,671,653

UNITED STATES PATENT OFFICE 2,671,653

COAL CUTTING MACHINE WITH REVERSELY POSITIONABLE TWIN SHEARING JIBS

William Vincent Sheppard, Rainworth, England

Application January 16, 1952, Serial No. 266,657

Claims priority, application Great Britain November 7, 1951

3 Claims. (Cl. 262—30)

This invention relates to coal cutting machines and is an improvement on the machine covered by my prior Patent No. 2,504,598 granted April 18, 1950, which is of the kind adapted to be traversed over the floor of a mine to-and-fro alongside the coal face thereof, the machine being provided with horizontal cutting jibs having chain type cutters for extending into and operating horizontally in the coal face for effecting undercutting thereof, and with a vertical shearing jib also having chain type cutters for extending into and operating vertically in the coal face for effecting a vertical cut therein remote from the face thereof and in a plane substantially parallel with the line of traverse of the machine, the undercutting and vertical cutting of the coal face being effected in each direction of traverse of the machine.

In the machine disclosed in my before mentioned prior patent adjacent upper and lower horizontal cutting jibs are mounted on a common supporting structure which is interposed between them and rooted to the body of the machine and a single vertical shearing jib is slung from said structure by a cantilever arm which is pivoted thereto and extended downwardly at its free end for riding on the mine floor in order to support the vertical shearing jib, said shearing jib having a cutter chain driving head for coupling up by a removable tranmission drive shaft at one or other of two points in the machine body to driving mechanism therein which is provided for operating the horizontal cutting jibs as well as the vertical shearing jib, said driving mechanism being so arranged that rotation of the transmission drive shaft at one of said two points is in the reverse direction to that at the other of said two points so as always to effect a downward movement of the cutter picks of the shearing jibs in the coal face.

The pivotal connection of the cantilever arm with the horizontal cutting jib supporting structure is necessary to enable said arm to be manipulably swung through 180° about its pivot and thereby swing the vertical shearing jib about the extremities of the horizontal cutting jibs, to the trailing position for each direction of traverse of the machine.

Furthermore, the vertical shearing jib is swivelably mounted on the cantilever arm for swinging movement thereabout for the reason that when the cantilever arm has been swung through 180° as before mentioned, the vertical shearing jib must then be swung around the outer end of the cantilever arm to bring said jib into the correct trailing position to present its chain cutter driving head towards the machine body for coupling up to the driving mechanism therein selectively at either side of the horizontal cutting jibs according to the direction of movement of the machine. This results in the cutter picks being disposed with their points for upward operation in the coal face and consequently a certain amount of lost time is involved at the end of each traverse of the machine in that each cutter pick has to be reversed or the whole cutter chain complete with cutter picks removed and reversely replaced for the points of the cutter picks to be disposed for downward operation.

An object of the present invention is to provide twin vertical shearing jibs for trailing in the wake of the horizontal cutting jibs by the cantilever arm such that there will not be any necessity for reversing the cutter chain or cutter picks thereof when the twin vertical shearing jibs are swung into trailing position for each change in direction of traverse of the machine.

A further object is to provide for more efficient breaking down and preparation of the coal for automatic loading.

Referring to the drawing filed herewith:

Fig. 2 is a sectional elevation on the line II—II of Fig. 1.

Fig. 3 is an end elevation of Fig. 1.

Fig. 4 is a sectional detail view taken on the line IV—IV of Fig. 1.

Figure 1:
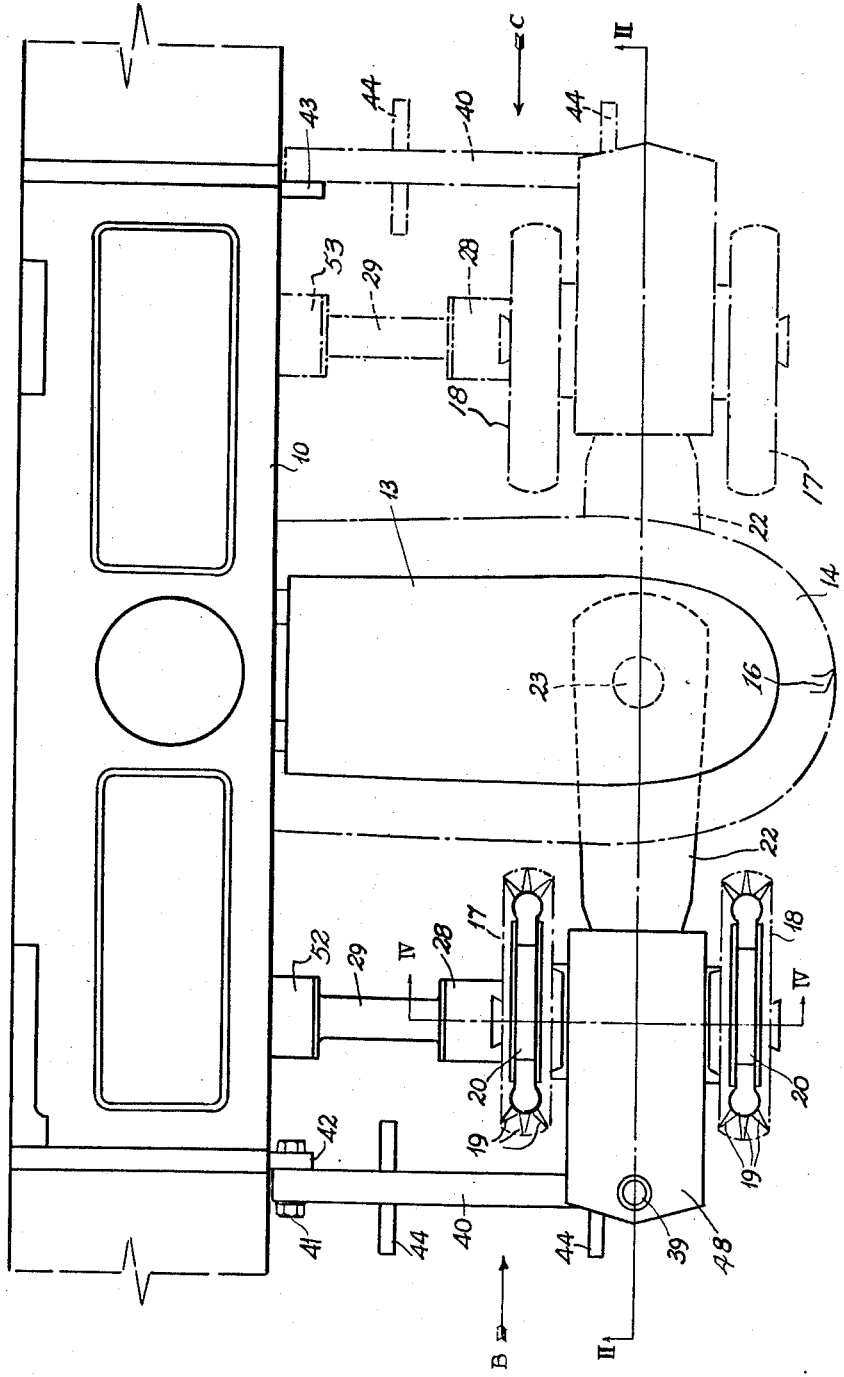
Fig. 1 is a plan of one form of coal cutting machine made in accordance with this invention.

The machine body with motor and gearing constituting driving mechanism therein is represented generally by the numeral 10 and is adapted to be traversed along the floor of a mine to-and-fro alongside a coal face.

Projecting at right angles from the body 10, medially of the ends thereof, is a common supporting structure 13 for a pair of upper and lower horizontal cutting jibs 14 and 15 each fitted with cutters 16 of the endless chain type for operating in the coal face to effect under-cutting thereof as the machine is hauled along the floor.

Slung from the outer end of the supporting structure 13 is a pair of twin vertical shearing jibs 17, 18 each fitted with cutters 19 also of the endless chain type, said vertical shearing jibs being disposed in opposing spaced relation upon spaced jib posts 20, the roots of which are integrally combined with an open-ended housing 21 by which the vertical shearing jibs are mounted on the free end of a cantilever arm 22 which is pivoted at 23 to the horizontal cutting jib supporting structure 13. The housing 21 is mounted on the cantilever arm 22 transversely thereof so as to dispose the vertical shearing jibs 17, 18 for operation one at each side of said arm as will be seen in Figs. 1 and 4.

The housing 21 accommodates a shaft 24 in bearings 25, said shaft carrying driving sprocket wheels 26, 27 constituting driving heads 26a, 27a for operating the cutter chains 19 of the respective shearing jibs 17, 18. Each sprocket wheel is adapted for the attachment thereto in conventional manner of a coupling 28 and a transmission drive shaft 29 so that one or the other of said sprocket wheels can be driven as will be hereinafter explained.

The housing 21 is fixedly attached to the cantilever arm 22 by a parallel sided anchoring plate 30 welded on to the basal plane face 31 of the housing, said plate being secured by set screws 32 to a wedge shaped bedplate 33 which is fastened by set screws 34 to the cantilever arm 22 interposedly between it and the anchoring plate 30.

The bedplate 33 being tapered, imparts to the housing 21 and consequently the shearing jibs 17, 18, an inclination to the vertical as will be seen in Fig. 2 so that the cutter chains 19 each operate with a formed inclination to the vertical relative to their direction of travel in their trailing position. Both the anchoring plate 30 and the bedplate 33 are orificed to accommodate a thrust block 36 located under and in contact with the basal plane face 31 of the housing, said thrust-block 36 being welded to the anchoring plate 30.

Secured to one side of the housing 21 is a pair of upper and lower eye brackets 37, 38 between which is secured by bolt 39 the eye end of a locking bar 40 for rigidly connecting the housing to the machine body 10 where at said locking bar is secured by bolt 41 to one or other of lugs 42, 43 on said machine body.

This locking bar 40 is provided intermediate of its ends with cross members 44 adapted to support a tray or chute (not shown) for the reception and discharge therefrom of gotten coal.

The inner ends of the two eye brackets 37 and 38 are welded to a distance piece 45 disposed between said eye brackets, said distance piece being secured to a seating face 46 at one side of the housing 21 by a set screw 47.

A cover plate 48 secured at one of its ends by the bolt 39 to the upper eye bracket 37 extends between the two vertical shearing jibs 17 and 18 and over the housing 21 where its other end is supported on the upper edge of a vertical supporting plate 49 which is secured to seating face 50 on the housing 21 by a set screw 51 disposed diametrically opposite the set screw 47.

In operation when the machine is being traversed in the direction of arrow B (Fig. 1) the vertical shearing jibs 17 and 18 are trailing behind the horizontal cutting jibs 14, 15 with a shearing jib 18 disposed innermost within the coal face and being operated in unison from the driving mechanism of the machine by the transmission shaft 29 being coupled to the shearing jib 17 and to the driving mechanism at 52 at one side of the horizontal jib supporting structure 13 as shown in full lines in Fig. 1, the chain cutters 19 of both shearing jibs 17, 18 operating in a clockwise direction and cutting downwardly in the coal as shown by the arrow in Fig. 2 but when the machine is being traversed in the direction of arrow C, the vertical shearing jibs 17, 18 again trail behind the horizontal cutting jibs 14, 15, but with the shearing jib 17 disposed innermost within the coal face, both shearing jibs being again operated in unison by the shaft 29 being coupled to the shearing jib 18 and to the driving mechanism at 53 at the other side of the horizontal cutting jib supporting structure 13 as indicated in chain lines in Fig. 1, the chain cutters 19 of both shearing jibs 17, 18 this time operating in an anti-clockwise direction and again cutting downwardly in the coal without any reversal of the chain cutters relative to their jibs having had to be effected.

It is to be understood that the driving mechanisms 52, 53 at opposite sides of the cutting jibs structure 13 operate in opposite directions to impart the clockwise and anti-clockwise direction to the chain cutters 19 of the shearing jibs 17 and 18 respectively hereinbefore mentioned.

It will be seen that, should it be desired to alter the angle of inclination to the vertical at which the shearing jibs 17, 18 are required to operate, this can be achieved by removing the tapered bedplate 33 and substituting another one having a different degree of taper which will support the shearing jibs at a different angle of inclination to the vertical.

Alternatively, by substituting a parallel sided bedplate, the vertical shearing jibs can be disposed vertically.

If desired, the vertical shearing jib posts 20 together with the housing 21 could be formed integral with the cantilever arm 22.

What I claim and desire to secure by Letters Patent is:

1. In a to and fro traversible mining machine having a plurality of horizontal cutting jibs mounted on a single supporting structure for operation by a common shaft and a cantilever arm pivotally connected to said structure for swinging movement about one end of each cutting jib to a trailing position in relation thereto for each change in direction of traverse of the machine, twin side-by-side vertical shearing jibs mounted in parallel with one another on the cantilever arm, one at each side thereof, endless chain cutters on said shearing jibs, a housing supporting said shearing jibs, means detachably securing said housing to and transversely of said cantilever arm, a driven horizontal shaft extending through the housing, driving heads at the opposite ends of said shaft, said driving heads being in unitary driving connection with the endless chain cutters on both said shearing jibs, driving mechanism in the machine at one point therein for one direction of traverse thereof, a transmission drive shaft for connecting one of the driven shaft ends to the driving mechanism, a second driving mechanism at another point in the machine for the opposite direction of traverse thereof and the other end of said driven shaft being similarly connectable by said transmission drive shaft to the second driving mechanism.

2. A mining machine according to claim 1 wherein the housing extends between said shearing jibs and is integrally formed therewith.

3. A mining machine according to claim 1 wherein means are provided for anchoring the housing to the machine, comprising eye brackets attached to the housing at one side thereof, an anchoring bar interposed between said eye brackets and having one end detachably pinned thereto and at the other end attached to the machine.

WILLIAM VINCENT SHEPPARD.

References Cited in the file of this patent

UNITED STATES PATENTS

| Number | Name | Date |
| --- | --- | --- |
| 2,143,789 | Moore | Jan. 10, 1939 |
| 2,210,919 | Joy | Aug. 13, 1940 |
| 2,504,598 | Sheppard | Apr. 18, 1950 |